United States Patent [19]

Matsumoto

[11] Patent Number: 4,769,679
[45] Date of Patent: Sep. 6, 1988

[54] PHOTOGRAPHIC PRINTING SYSTEM

[75] Inventor: Fumio Matsumoto, Tokyo, Japan

[73] Assignee: Fuji Photo Film Co., Ltd., Kanagawa, Japan

[21] Appl. No.: 38,778

[22] Filed: Apr. 15, 1987

[30] Foreign Application Priority Data

Apr. 21, 1986 [JP] Japan .................................. 61-91878
May 9, 1986 [JP] Japan .................................. 61-106426

[51] Int. Cl.$^4$ ............................................ G03B 27/52
[52] U.S. Cl. ....................................... 355/41; 355/77; 358/213.26
[58] Field of Search ................... 355/38, 40, 41, 68; 358/213.13, 213.19, 213.26, 214, 215; 250/559-561, 571

[56] References Cited

U.S. PATENT DOCUMENTS

| 4,204,230 | 5/1980 | Sprague | 358/213.26 |
|---|---|---|---|
| 4,610,537 | 9/1986 | Matsumoto | 355/68 |
| 4,611,907 | 9/1986 | Inatsuki | 355/41 |
| 4,650,316 | 3/1987 | Matsumoto | 355/68 |
| 4,659,213 | 4/1987 | Matsumoto | 355/38 |
| 4,660,965 | 4/1987 | Matsumoto | 355/41 |
| 4,666,306 | 5/1987 | Matsumoto | 355/38 X |
| 4,666,307 | 5/1987 | Matsumoto et al. | 355/38 X |
| 4,667,245 | 5/1987 | Matsumoto | 358/214 |

Primary Examiner—Michael L. Gellner
Assistant Examiner—D. Rutledge
Attorney, Agent, or Firm—Wenderoth, Lind & Ponack

[57] ABSTRACT

A detection/processing method for image information which is obtained by photometrically measuring an original film with a two-dimensional image sensor and which is segmented into picture elements including the steps of: detecting and processing data for controlling the conveyance of said original film from one of either a singular picture element array or plural picture element array, said array or arrays intersecting at a right angle with the conveying direction of said original film and said data being detected and processed in accordance with the size of the original film; detecting and processing data for controlling exposure from the picture element matrix of said original film in accordance with said direction and size of the original film.

11 Claims, 15 Drawing Sheets

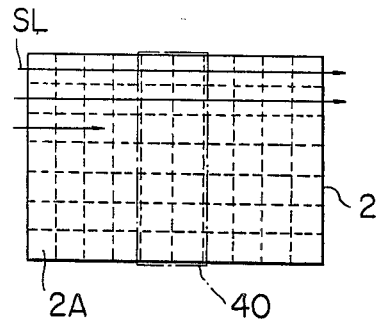
FIG. 3A
FIG. 3B
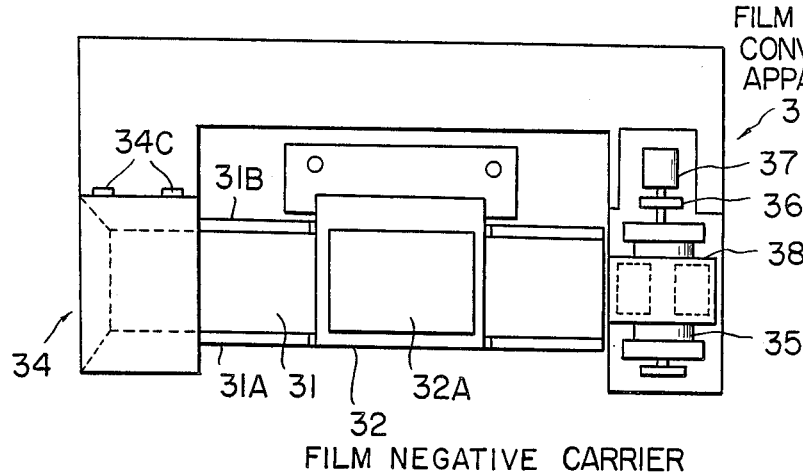
FIG. 4A
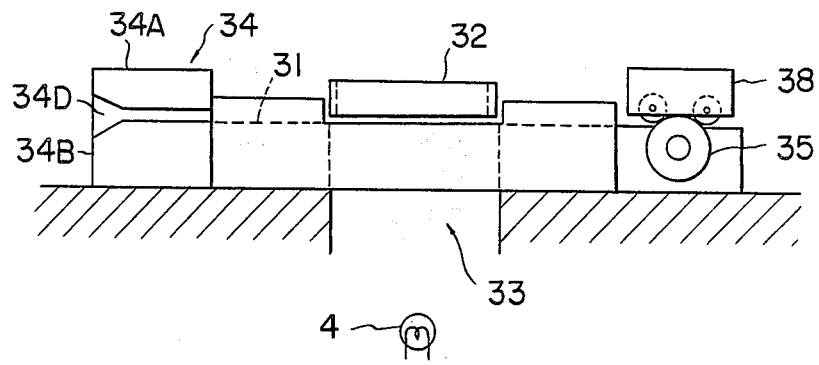
FIG. 4B

FIG. 17A

CHANGES IN LIGHT AMOUNT

200

100

0

MOVEMENT AMOUNT

MOVEMENT AMOUNT

INVERTING TIME

CHANGE IS ZERO

MOVEMENT AMOUNT

FIG. 18 (UNIT mm)

| FRAME No | 1 | 2 | 3 | 4 | 5 | 6 | 7 | 8 |
|---|---|---|---|---|---|---|---|---|
| DISTANCE $l$ — DETECTION VALUE DT AT LIGHT AMOUNT 65% | 1.01 | 0.99 | 1.03 | 1.10 | 0.94 | 0.99 | 1.17 | 1.15 |
| DISTANCE $l$ — MEASURE VALUE R OF MOVEMENT | 1.00 | 1.00 | 1.00 | 1.00 | 1.00 | 1.00 | 1.00 | 1.00 |
| DETECTION ERROR DT−R | +0.01 | −0.01 | +0.03 | +0.10 | −0.06 | −0.01 | +0.17 | +0.15 |

| FRAME No | 9 | 10 | 11 | 12 | 13 | 14 | 15 | 16 |
|---|---|---|---|---|---|---|---|---|
| DISTANCE $l$ — DETECTION VALUE DT AT LIGHT AMOUNT 65% | 1.00 | 0.76 | 1.01 | 1.02 | 0.86 | 0.95 | 1.03 | 0.96 |
| DISTANCE $l$ — MEASURE VALUE R OF MOVEMENT | 1.00 | 1.00 | 1.00 | 1.00 | 1.00 | 1.00 | 1.00 | 1.00 |
| DETECTION ERROR DT−R | 0.00 | −0.24 | +0.01 | +0.02 | −0.14 | −0.05 | +0.03 | −0.04 |

| FRAME No | 17 | 18 | 19 | 20 | 21 | 22 | 23 | 24 |
|---|---|---|---|---|---|---|---|---|
| DISTANCE $l$ — DETECTION VALUE DT AT LIGHT AMOUNT 65% | 0.92 | 0.75 | 0.97 | 0.95 | 0.93 | 1.00 | 0.99 | 0.88 |
| DISTANCE $l$ — MEASURE VALUE R OF MOVEMENT | 1.00 | 1.00 | 1.00 | 1.00 | 1.00 | 1.00 | 1.00 | 1.00 |
| DETECTION ERROR DT−R | −0.08 | −0.25 | −0.03 | −0.05 | −0.07 | 0.00 | −0.01 | −0.12 |

PHOTOGRAPHIC PRINTING SYSTEM

BACKGROUND OF THE INVENTION

This invention relates to a photographic printing system which can effectively detect and process image information on an original film such as a film negative sheet by a two-dimensional image sensor having a relatively rough picture element density and which can automatically position imaged frames according to the information on feeding direction and size of the original film.

Photographic printing systems need to measure the density of an original film (e.g. a film negative sheet) in order to determine its optimal printing exposure or correction amount. The average density of the film negative is photometrically measured in LATD (Large Area Transmittance Density) in the prior art with photosensors such as photodiodes which are provided near a light path in the photographic printing system. The prior art is defective, however, in that it could not accurately measure exposure or correction amounts because the image detection in the LATD is intended to photometrically measure the average image density of the film negative but not to precisely measure the image density across the whole surface of the film negative. The present applicant has filed applications which have been laid-open under Japanese Laid-open Pat. Nos. 154244/1985, 151631/1985 and 220325/1985 in order to solve the problem. But there arises a dilemma in that if the picture element density of an image sensor is increased, the costs for the image sensor as well as peripheral circuits will be pushed up and the time required for processing is prolonged. For a quick exposure amount operation and so on, the picture element density of the image sensor is preferably relatively rough.

In a photographic printing system, it is further necessary to accurately position a frame of the original film on a photographic frame in order to suitably print images on a sheet of photographic paper. In the case of the film sizes where frames and perforations do not correspond in a 1:1 relationship, like the 110 size and the 126 size, for example, in the case of the 135 size, notches are cut on the sides of a sheet of the original film in the prior art, and then detected by photosensors and then used for positioning. This method, however causes lots of trouble since the notches should be cut with utmost care to have accurate correspondence with the frame positions. There is another positioning method which feeds a sheet of the original film by a predescribed distance, but positional deviations tend to accumulate so as to deteriorate the precision. Still another method proposes that photosensors such as photodiodes are arranged in correspondence to the shapes of frames to position the original film according to the states detected by photosensors and sequence of detection, but this method inconveniently needs a complicated structure and control algorithm. The method is further defective because the slit mask which is mounted in order to enhance resolution tends to lower the sensitivity.

The present applicant proposed the units disclosed in Japanese Laid-Open Pat. Nos. 196740/1985, 185793/1875, etc. in order to solve the problems, but the picture element density of the image sensor required in those units requires a relatively high resolution. This is because unless un-exposed portions on edges or between frames are precisely detected, conveyance of the original film cannot be controlled accurately.

The present applicant proposed still another method (e.g. Japanese Laid-Open Pat. No. 109040/1986) for detecting images on film frames and suspending the feeding by using an image sensor. But this method is applicable only to one directional feeding systems and not to the photographic printing systems which can feed films in vertical as well as lateral directions without complicated mechanical changes; i.e. the attachment position of the image sensor should be mechanically changed depending on the feeding directions of the film. FIG. 1 shows a photographic printing system wherein a film negative 2 can be fed and conveyed in the direction either parallel to or perpendicular to the conveyance direction of a photographic paper 7. This method reduces the types for mounting the photographic paper 7, improves the printing efficiency, and are applicable to film negatives of sizes other than the 126 size which has square frames. There has long been a desire to develop a precise and effective method for detection/suspension of image frames for the above-mentioned type of the photographic printing system which can switch the direction of the film negative feeding.

SUMMARY OF THE INVENTION

This invention was contrived to eliminate abovementioned problems encountered in the prior art and aims at providing a detection/processing method for image information which can detect image information from an original film such as a film negative for exposure control with a two-dimensional image sensor having a relatively low resolution, process image information from the original film with increased resolution under the controlled conveyance and automatically deal with a variety of frame sizes and feeding directions.

Another object of this invention is to provide a method for detecting imaged frames quickly and effectively which can detect image information from an original film such as a film negative sheet with a two-dimensional image sensor, process the data selected from the picture element arrays of the image sensor which intersect the feeding direction of the original film, and decide the travelling distance in accordance to the size information and edge detection to thereby precisely position the image frames.

According to one aspect of this invention, for achieving the objects described above, there is provided a detection/processing method for image information which is obtained by photometrically measuring an original film with a two-dimensional image sensor and is segmented into picture elements wherein, when data is being detected for controlling the conveyance of said original film, data is detected from a singular picture element array or plural picture element arrays which is selected in a manner so as to intersect at a right angle to the conveying direction of said original film and in accordance with the size of the original film, extracted and processed, but when data is being detected for controlling exposure, data which is detected from the picture element matrix of said original film in accordance with said direction and size of the original film are processed in set.

According to another aspect of this invention, there is provided a detection/processing method for image information which is obtained by photometrically measuring an original film with a two-dimensional image sensor and which is segmented into picture elements wherein, when data is being detected for controlling the conveyance of said original film data is detected from a singular picture element array or from plural picture element arrays which is selected in a manner so as to intersect at a right angle to the conveying direction of said original film and in accordance with the size of the original film extracted and processed, the outputs of said picture element array(s) detected at a pitch relatively smaller than the picture element pitch on said two-dimensional image sensor are processed to interpolate said picture element pitch so as to detect image data of a high resolution, but when data is being detected for controlling exposure, data which is detected from the picture element matrix of said original film in accordance with said direction and size of the film are processed in set.

Further, according to still another aspect of this invention, there is provided a detection/suspension method for imaged frames which comprises the steps of receiving with a two-dimensional image sensor the light transmitted to an original film sheet from a light source, detecting the transmitted or reflected light from said original film for calculation so as to detect the edges of frames on said original film, and advancing said film by a predetermined distance in accordance with the size thereof and suspending the same at a location, wherein detected data is selected from picture element array(s) of said sensor which intersect(s) at a right angle to the conveying direction of said film for processing so as to detect said edges.

Still further, according to another aspect of this invention, there is provided a detection/suspension method for imaged frames which comprises the steps of receiving with a two-dimensional image sensor the light transmitted to said original film from a light source, detecting the transmitted or reflected light from said original film for processing so as to detect the edges of imaged frames of said film, and advancing the film by a predetermined distance in accordance with the size thereof and suspending the same at a location, wherein image data of the whole area from which said two-dimensional image sensor receives the light are detected for each segmented picture element, the characteristic volume of said detected values are compared with stored data to discriminate the size and direction of said original film, detected data are selected from the picture element arrays where the conveying direction intersects at a right angle to the image sensor direction based upon the discriminated direction of said film, and said edges are detected therefrom for detection/suspension of the conveying of the original film.

The nature, principle and utility of the invention will become more apparent from the following detailed description when read in conjunction with the accompanying drawings.

BRIEF DESCRIPTION OF THE DRAWINGS

In the accompanying drawings:

FIGS. 3A and 3B are charts showing correspondence between picture element segments and stored data;

FIG. 4A is a plane view showing the detailed structure in a printing section;

FIG. 4B is a side view of the structure shown in FIG. 4A;

FIGS. 16A, 16B and 17A through 17C are graphs respectively showing the state of edge detection;

FIG. 18 is a table of the results of measurements; and

DESCRIPTION OF THE PREFERRED EMBODIMENTS

Before going into detailed explanation of this invention, a photometric method for an original film such as a film negative will be described as a basis of this invention. This applicant has proposed methods for detecting the film negative with an image sensor which are disclosed in Japanese Laid-open Pat. Nos. 196740/1985 and 151633/1985, etc.

Figure 2:
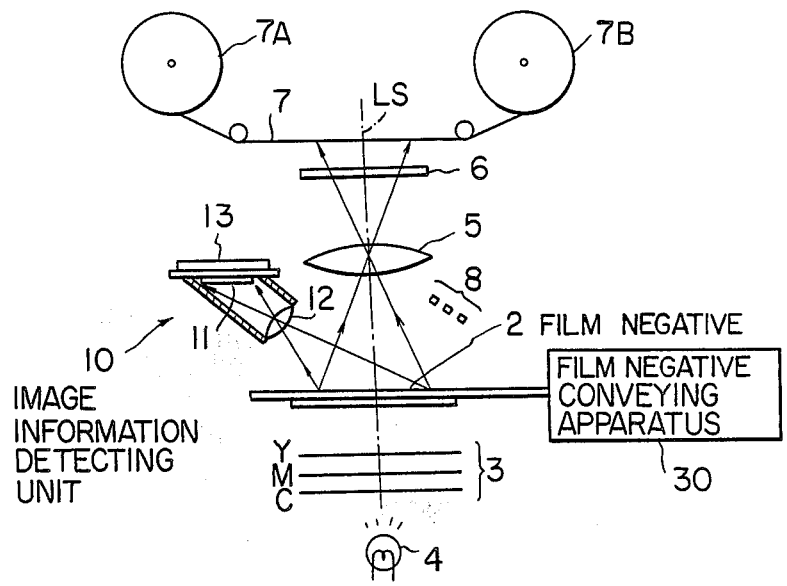
FIG. 2 in a structural view showing an embodiment where this invention method is applied to a photographic printing system.

According to this invention, as shown in FIG. 2, an image information detecting unit 10 is provided at a printing section close to a film negative 2 and includes a two-dimensional image sensor 11 of surface scanning type comprising a CCD (Charge Coupled Device), for example, so that image information on the film negative 2 is segmented into a large number of picture elements and then detected. More particularly, when predetermined driving signals are fed from a driving circuit (not shown) to the image sensor 11, the image sensor 11 receives the light which has been transmitted through the film negative 2 placed at the printing section via a lens unit 12. The image sensor 11 divides the whole surface of the film negative 2 into a large number of well-ordered arrays of picture elements 2A as shown in FIG. 3A so that the frame can be scanned sequentially along scanning lines SL. An output register of the image sensor 11 sequentially outputs image signals in accordance with the scanning of the frame, the image signals are sampled and held by a sample and hold circuit (not shown), and the sampled and held values are converted by an A/D converter into digital signals. The digital signals from the A/D converter are controlled by a write-in controller so as to be stored in a memory in the arrangement corresponding to the picture elements 2A as shown in FIG. 3B and in anti-logarithmic digital values (or density values obtained by table conversion and so on) of the film negative 2.

The film negative 2 is sequentially conveyed to the printing section by a film negative conveying apparatus 30. The conveying apparatus 30 is adapted to mount a film negative carrier 32 at the center of a conveying path 31 as shown in FIGS. 4A and 4B, the negative film carrier 32 having a rectangular aperture 32A of a size corresponding to the size of the film negative 2. The film negative 2 is to be conveyed between the conveying path surface 31 and the film negative carrier 32. Guiding walls 31A and 31B are erected on both sides of the conveying path 31 to guide the movement of the film negative, and a hole 33 is disposed at a location immediately below the film negative carrier 32 to receive the light from a light source 4. A guiding member 34 is provided at an inlet of the conveying path 31 and comprises an upper plate 34A and a bottom plate 34B for holding and smoothly guiding the film negative; the upper plate 34A can be opened/closed with hinge members 34C. A drive roller 35 is provided at an outlet of the conveying path 31 which takes up the film negative which has been printed. The drive roller 35 is driven by a pulse motor 37 via a reduction gear mechanism 36. A nip roller 38 comprising a pair of rollers is provided above the drive roller 35 for smoothly mounting and winding the film negative, and is opened/closed upward with a hinge member (not shown).

In such the apparatus having above-mentioned structure, the film negative to be printed is guided into an opening 34D of the guiding member 34, onto the conveying path 31 and under the film negative carrier 32, and finally reaches an end of the conveying path 31 and wound on the drive roller 35 via the nip roller 38.

Figures 5A, 5B:
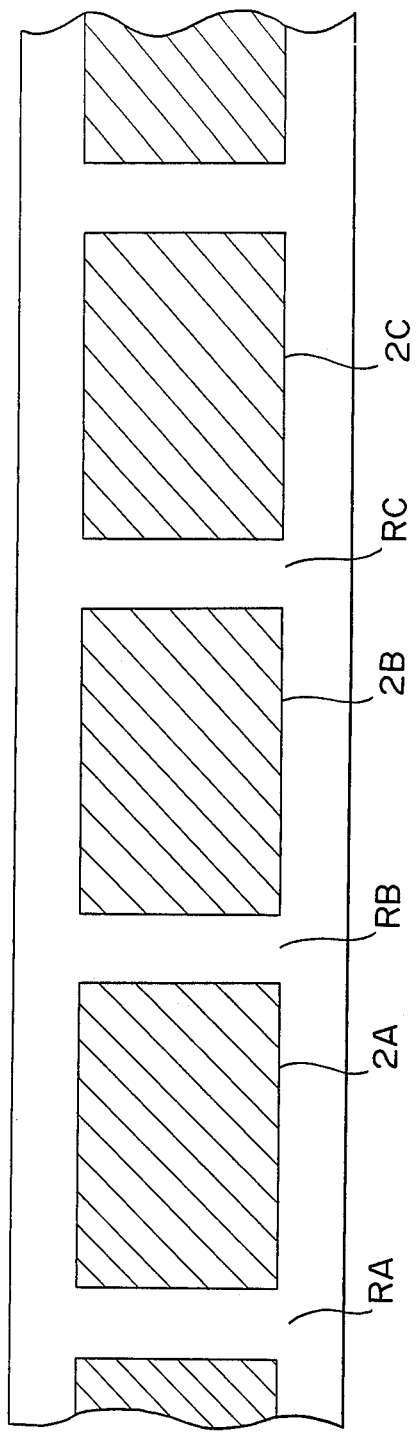
FIGS. 5A and 5B are views showing the correspondence between a film negative and image information.

After the film negative 2 has been conveyed to the printing section, it is necessary to precisely position photographed image frames 2A, 2B, 2C, ... of FIG. 5A on the film negative carrier 32. A printed frame should be moved by conveying the film negative 2 for a suitable distance until a next frame is positioned for printing. In order to suspend the movement of the film negative 2 at a predetermined location, notches are cut by a notcher on the film negative in the prior art. According to this invention, image information in the unit of picture element of the image sensor 11 shown in FIG. 5B are detected from the film negative 2 shown in FIG. 5A so that only imaged frames 2A, 2B, 2C, ... can be detected from such image information but unexposed areas RA, RB, RC, ... between adjacent imaged frames can be detected from the density data thereof so as to thereby enable detection of size information and so as to control the frame movement simultaneously. If all the detected information must be used for the control of the frame movement, however, it would require lots of time for processing. This necessitates enhancement of the processing speed of microcomputers to thereby inconveniently push up the costs of the system. In order to avoid such an inconvenience, as shown in FIG. 3A, linear picture element arrays 40 which perpendicularly intersect the feeding direction of the film negative 2 are electrically extracted from the central portion of the two-dimensional image sensor 11, and the edges of a frame are detected by means of the picture element arrays 40.

When the resolution of the image sensor 11 is high, the unexposed portion or edges of image frames can be detected with a higher faculty, but on the other hand, a larger number of picture elements become involved so as to complicate processing. In order to shorten the processing time, this invention method utilizes a two-dimensional image sensor 11 which has a relatively rough picture element density. More specifically, in photometrically measuring the film negative for calculation of the exposure amount, etc., the imaged frames of the film negative is scanned and measured by the image sensor 11 comprising picture elements at a relatively rough density. Methods for determining the exposure amount in printing have been disclosed in Japanese Laid-open Pat. Nos. 23936/1977 and 28131/1977, and Japanese Patent Publication No. 2691/1981, etc., and the method for determining the exposure amount with a two-dimensional image sensor is disclosed in Japanese Laid-open Pat. No. 196740/1985. The method for determining the exposure amount which is disclosed in Japanese Laid-open Pat. No. 177337/1985 is applicable to processing detected data of a picture element matrix in set so that a calculation formula for exposure can be shared by film types of various sizes.

The information detected for the edges of a frame can also be used for controlling the film negative conveyance as will be described below by referring to an example. The method disclosed in Japanese Laid-open Pat. No. 196740/1985 may be used, too.

Figure 6:
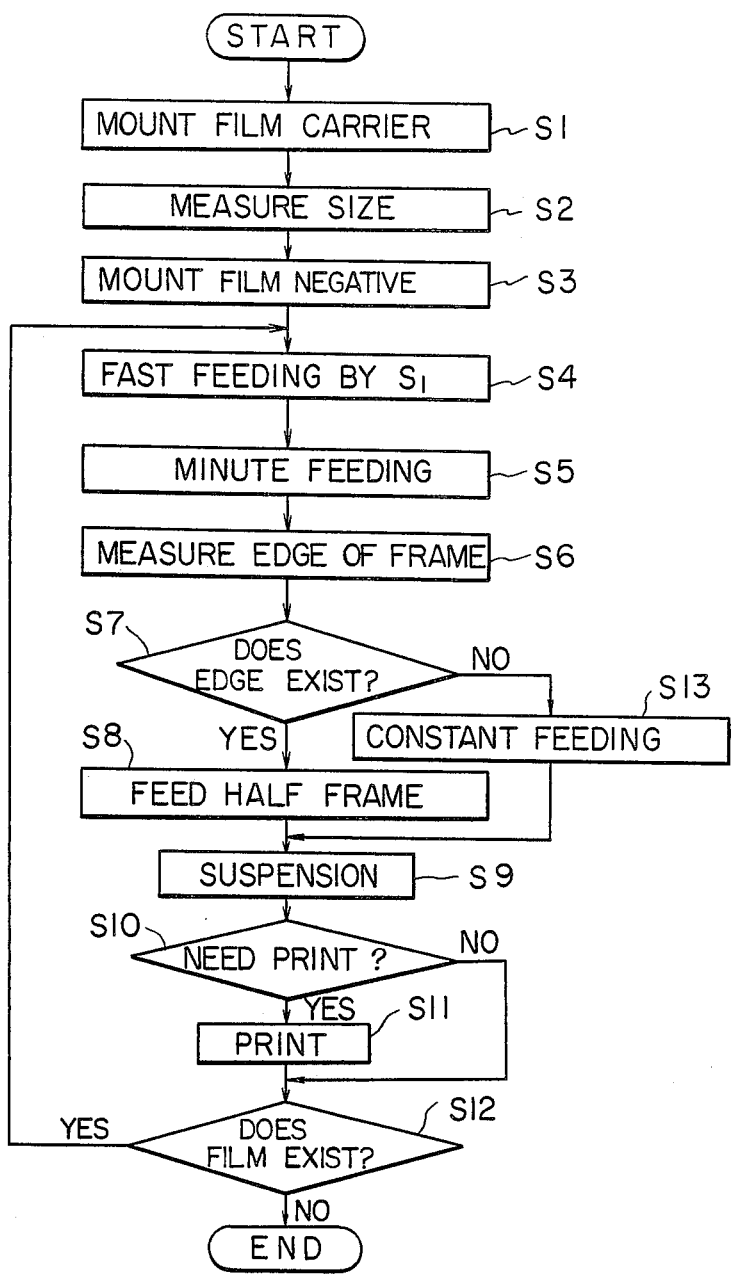
FIG. 6 is a flow chart showing an operation example of the detection/suspension of image frames.

FIG. 6 is a flow chart of an example of detection/suspension of image frames according to this invention method. A film negative carrier 32 of the size in accordance with the size of the film negative 2 to be printed is mounted at a predetermined position of a printing section (Step S1), and the size of the aperture 32A of the film negative carrier 32 is measured by the image sensor 11 in a manner disclosed in Japanese Laid-open No. Pat. 151626/1985 (Step S2). This measurement of the size may be conducted visually. The information thus obtained is used to determine the distance to move the film negative 2, automatically select and extract the picture element arrays 40 shown in FIG. 3A in a manner described hereinafter, and to control the printing exposure amount or the correction amount thereof in printing.

Figure 7:
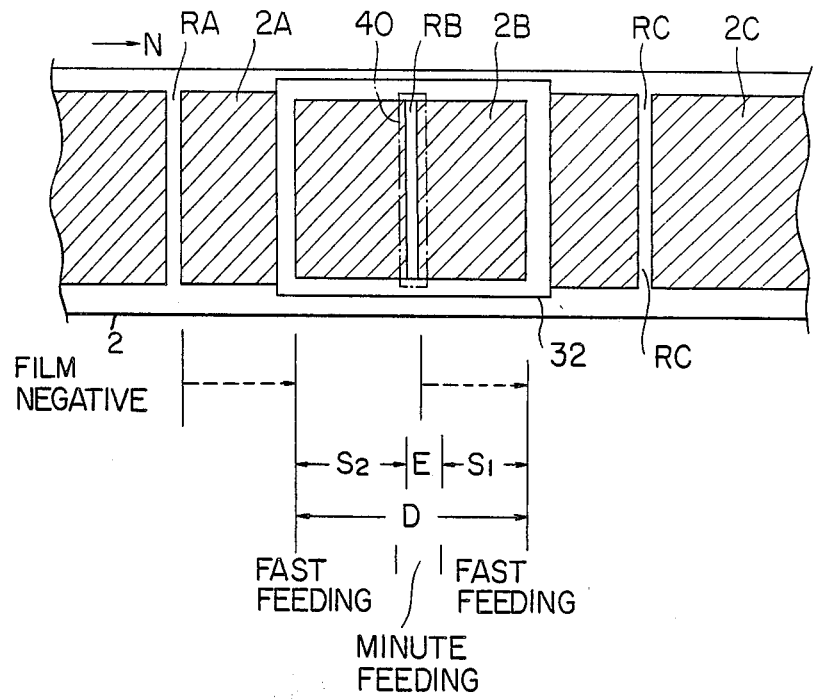
FIG. 7 is a view showing a state on a film negative carrier.

The film negative 2 is mounted on the film negative carrier 32 in a manner such that an unexposed frame at the top of the film negative is positioned approximately within the aperture of the film negative carrier 32 (Step S3). When one end of the film negative 2 is engaged by the drive roller 35, a pulse motor 37 is driven to advance the film negative 2 by a distance $S_1$, slightly less than one half of the interval D between frames at a fast speed (Step S4), and to adjust the position minutely by slowly moving the film negative 2 in small pitches (Step S5). Meanwhile image information is detected by the image sensor 11 to obtain them in the unit of picture elements as shown in FIG. 5B. As is obvious from the relationship between FIG. 5A and FIG. 5B, since there generally is a conspicuous difference in density between the exposed frames 2A, 2B, 2C, ... and the unexposed areas RA, RB, RC, ... between the frames, the edges between the imaged frames and unexposed inter-frame areas can be detected by seeking within the picture element arrays 40 of the image sensor 11 the zones which have densities within a predetermined value and yet of which densitites change drastically in a lateral direction but stay within a prescribed scope in a vertical direction (or the direction which is vertical to the feeding direction of the film negative 2). FIG. 7 shows the state where the film negative 2 is being conveyed in the direction N with respect to the film negative carrier 32, and the unexposed areas RB between frames are detected by the picture element arrays 40 of the image information detecting apparatus 10. Consequently, the picture element arrays 40 are brought to the center of the aperture of the film negative carrier 32. Although the width of an edge is shown wider than it is for facilitating understanding in FIGS. 7 and 5B, the actual width of the edge on the film negative 2 is on the order of several millimeters which is still large enough to be detected even by an image sensor having a relatively low resolution. When detected by an image sensor with a relatively low resolution, the density does not changes drastically but only mildly from the unexposed areas to the imaged frames, and if the film negative 2 is conveyed slowly in a minute pitch or pitch of one tenth of a millimeter, the edges can be detected by detecting the chronological changes of the picture element data for one line of the image sensor, and directional changes (or by the position where changes become zero) in feeding directions with the relative difference or relative ratio of picture elements between two lines.

Until the above edges between frames are detected, the film negative 2 is moved slowly and minutely (Step S5), and when an edge between an imaged frame 2A and an unexposed area RB is detected, the film negative 2 is conveyed quickly by the distance $S_2$ which is the distance required for bringing the frame to the predetermined printing position and which has been obtained from the size information obtained by the size measurement at the Step S2 (step S6, S7, S8). Then, the feeding of the film negative 2 is suspended (Step S9). The distance E from the point where the fast feeding of the film negative ended to the point where the edge between the unexposed area between frames 2A and 2B and the frame 2A, or the point which is situated approximately at the center of the film negative carrier 32 is a parameter (a variable) to correct the dispersion in distances in the unexposed areas RB. If the film negative 2 is conveyed by the distance $D=S_1+E+S_2$ in the state shown in FIG. 7, the frames of the film negative 2 would be suspended precisely at a position in the printing section. When the edge between frames is not detected by the picture element arrays of the image information detecting apparatus 10, the film negative 2 is conveyed by the distance D as a stop gap measure (Step S13).

After having conveyed the film negative 2 to the right position, the frame position is judged so as to determine whether or not it is suitable for printing (Step S10), if it is judged unsuitable, the step will be advanced to the Step S12 by skipping the Step S11, and if it is judged suitable, the images of the positioned frame are printed with a calculated exposure and correction amount (Step S11), and then printing procedure for this particular frame ends. In order to print the images of succeeding frame, the presence/absence of unprinted film length is judged, and the film negative 2 is conveyed fastly by the distance slightly less than one half of the frame distance based on the size information obtained in the Step S2 (Step S12, S4). By repeating above-mentioned steps of conveyance and suspensions of the film negative 2, images of a succession of frames can be printed automatically and sequentially. When there is no more film length at the Step S12, the driving roller 35 is suspended automatically to end the process. Although image information is detected from the central portion of the film negative 2 positioned at the film negative carrier 32, the information may be detected from the portions close to the center or peripheral portions.

Figure 1:
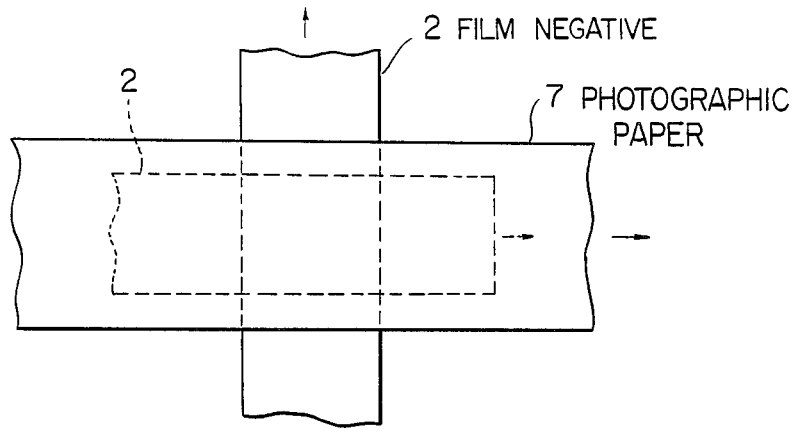
FIG. 1 is a view used to explain the feeding directions of film negatives.
Figure 8:
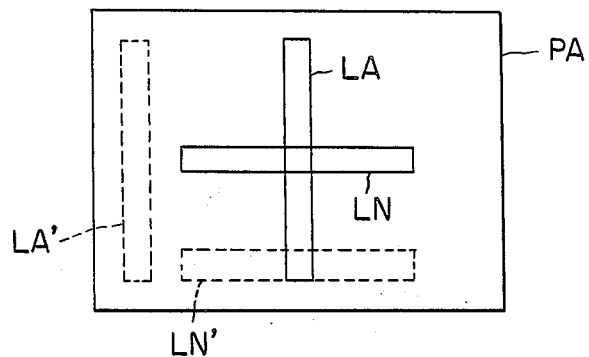
FIG. 8 is an explanatory view showing the switching of the feeding direction for detecting data.

The above description was made for the system where the film negative 2 is conveyed in one direction. In case where the system can convey it in two directions such as the one described in relation to FIG. 1, the position to detect with the two-dimensional image sensor 11 is mechanically switched or two line sensors are provided at a right angle. According to this invention, the position of the two-dimensional image sensor 11 is fixed, and data detected from picture element arrays which are arranged perpendicular to the film feeding direction are extracted for processing based on the information about the feeding direction. This invention method therefore is applicable to lateral as well as vertical feeding directions without mechanical switching of the optical system. More specifically, if it is assumed that the stored image data detected with the fixed image sensor 11 is an area PA in FIG. 8, the data is detected from the area LA if the input information about the feeding direction informs that the direction is lateral while the data is detected from the area LN if the input information informs of the vertical direction. It is quite simple to automatically switch the memory area LA to LN from which data is extracted based upon the information on the feeding directions. Without switching the position of the image sensor 11 or an optical system, data necessary to convey or suspend the film can be obtained simply. The areas from which data are detected may be LN' and LA' marked with broken lines. Although all the data are stored in the memory and necessary data are extracted from a certain area at a read-out time in the above example, they may be extracted at the same time as they are stored at the memory to save time of processing and capacity of memory.

Although in the above example, the information on the feeding direction and size of the film are inputted by a certain means, they may be automatically detected and inputted with the image sensor 11 described above.

Figure 9:
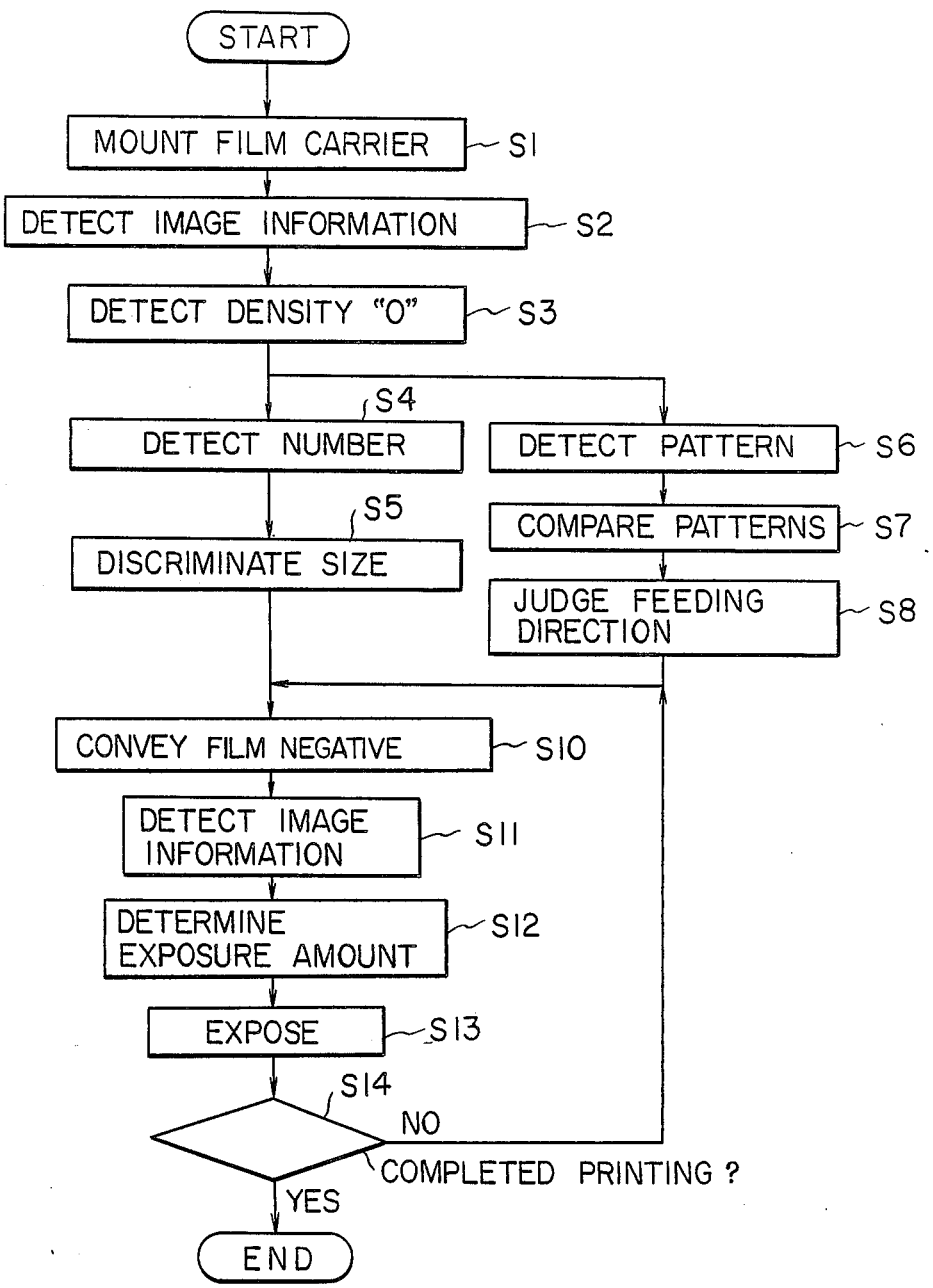
FIG. 9 is a flow chart showing an example of discrimination of feeding directions and sizes with a two-dimensional image sensor.
Figure 10A:
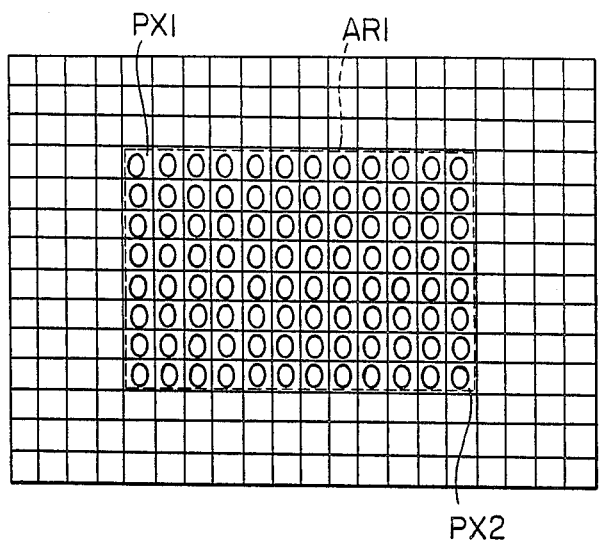
FIGS. 10A and 10B are views of detected data to indicate the difference in feeding direction.
Figure 10B:
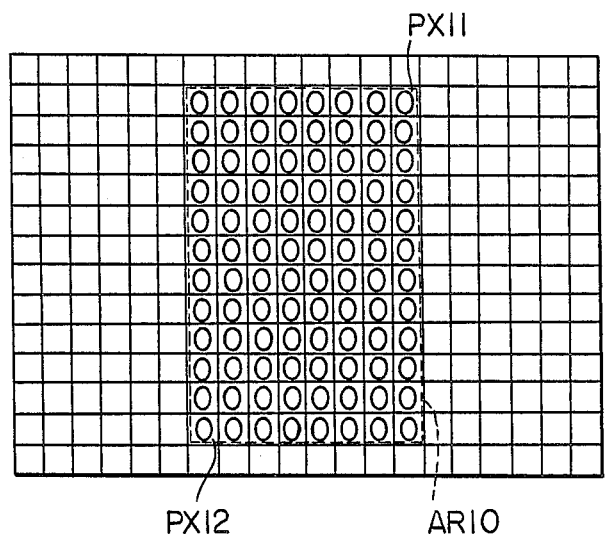

The automatic detection method of feeding direction and size of the film is described below. For discrimination of film sizes, the method disclosed in Japanese Laid-open Pat. No. 151626/1985 may be used, and the feeding directions may be discriminated in accordance with the flow chart of FIG. 9. More particularly, the film negative carrier 32 is mounted at a predetermined position of a photographic printer (Step S1), an unexposed area at either top or end of the film negative 2 is placed in the aperture of the film negative carrier 32 (or without placing any film negative 2 therein), image information is detected by the two-dimensional image sensor 11 of the image information detecting apparatus 10 (Step S2), and the density "0" (or a value approximate thereto) is detected (Step S3). By counting the number of detections of the density "0", the size is discriminated (Steps S4, S5). The detected data is compared to the patterned information comprising the density "0" data stored in a memory in advance as shown in FIGS. 10A and 10B (Steps S6, S7). In this example, as lateral feeding patterns shown in FIG. 10A and vertical feeding patterns shown in FIG. 10B are stored in the memory for every film size, the feeding direction of a particular film negative may be judged by simply comparing the detected pattern to the stored data (Step S8). After having discriminated the direction of the film feeding and the size of the film negative carrier 32 or the film negative 2, the mounted film negative 2 is conveyed with the conveying apparatus 30 (or if it is not yet mounted, it is mounted) (Step S10) to position a predetermined imaged frame at an exposing section, and then the imaged frame is detected by the image information detecting apparatus 10 (Step S11). The information thus obtained on the imaged frame are classified by the size and the feeding direction, and the classified data is substituted in a calculation formula as parameters to obtain the exposure amount (Step S12). The photographic printer exposes the frame with the amount of light calculated as the exposure amount in the above step (Step S13) and the aforementioned steps repeated until all the images in the frames are printed.

Although the feeding directions are discriminated by comparison of characteristic density patterns, discrimination may be conducted by the characteristic density values or the number of densitites, patterns, amount or number of anti-logarithmic values, or any combination thereof. The feeding direction and size of the film negative 2 can be automatically discriminated in the manner above by using the image sensor 11.

The two-dimensional image sensor 11 having picture elements of relatively rough density is used in the embodiment in order to enhance the rapid calculation of exposure amount, but it is generally necessary to have fine density picture elements for detecting edges of the image frames in order to precisely control the conveyance of the film negative 2. This invention method attempts to heighten the resolution by employing pitch interpolation, which will now be described below.

Figure 11:
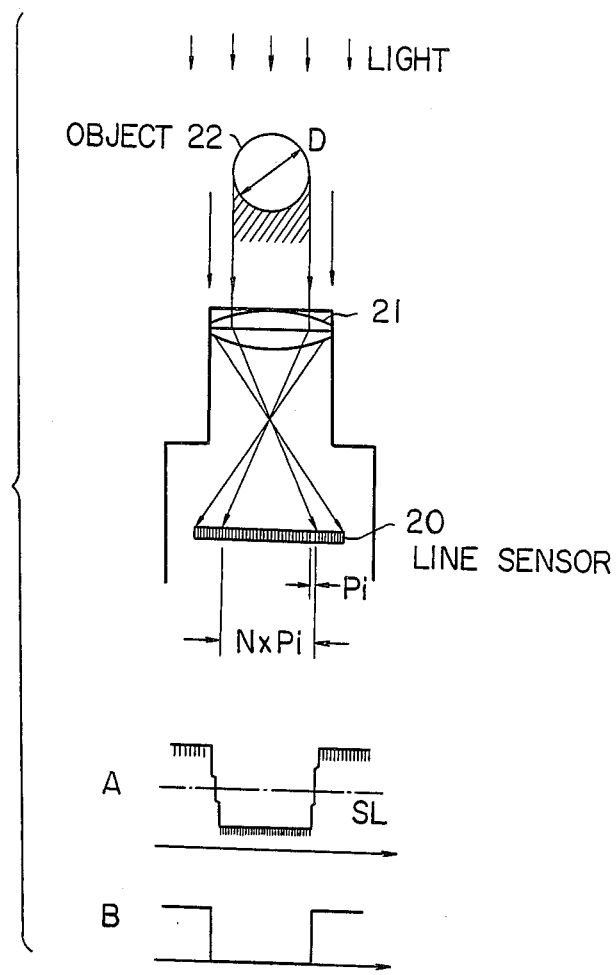
FIGS. 11 and 12 are views used to explain the principle of pitch interpolation according to this invention.

A photometric method with an image sensor such as a line sensor basically comprises the steps of digitizing the images of an object 22 (of the diameter D) focused on a line sensor 20 via a lens 21 as shown in FIG. 11 into binary values shown in B of FIG. 11 by the quantizing level SL shown in A of FIG. 11 to obtain the number N of picture elements or either bright or dark photoelectric elements (for instance the number is 1024 to 2048), calculating N×Pi setting the picture element pitch Pi as a constant (for example, 14 to 28µ), and then multiplying it by the magnification a of the lens 21 to obtain the size D of the object 22. The above photometric method has the following characteristics:

(1) The time needed for measurement is short (0.5 to 100 milliseconds).
(2) Since there is no movable part involved, the durability is almost permanent.
(3) The application as a no-contact measurement method is extremely wide.
(4) As long as it is used within the wavelength to which image sensors are sensitive, no restrictions are imposed on light.
(5) The allowable scope for position of objects is wide.

Due to the aforementioned various advantages, the method satisfies the requirements of on-line measurement which is indispensable for advanced technology. However, there still remains a factor for errors in various measurements because the method involves steps of image picking as well as photo-electric conversion. More basically, the method is not completely free of problems since the measurement precision and measurement scope are restricted by the number of picture elements N and the picture element pitches Pi. In recent years, the picture elements can be segmented even more minutely to the extent of several µ pitches along with technological advancement in LSI manufacturing. But it is desirable in the field of processing for exposure or correction in photographic processings to segment a frame of images into picture elements in the unit of several hundred points with the resolution in the order of several millimeters in order to extract the most conspicuous features of the picture as well as to reduce the cost and to process at a higher speed.

Figure 12:
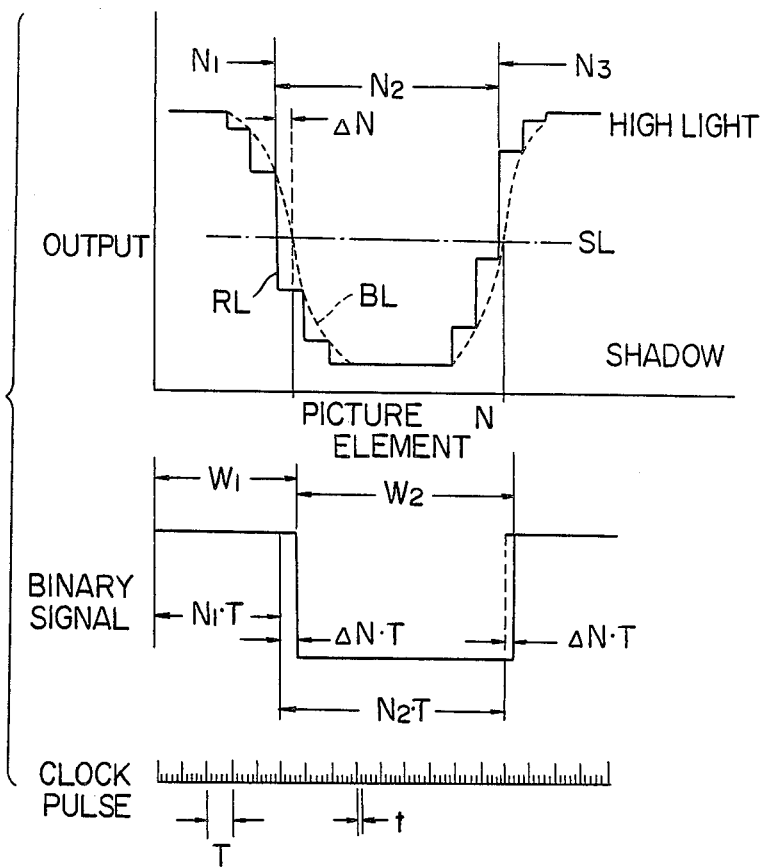

This invention enables reading a pitch between picture elements of the two-dimensional image sensor 11 by interpolation to achieve the resolution as high as ten times that of the picture element pitch Pi (in the unit of one tenth of millimeter) which is practically usable in edge detection of imaged frames of the film negative. Conventionally, when a dimension of an image is measured with an image sensor, it was generally thought impossible to have measurement precision higher than the picture elements. That was attributable to the fixed concept that image reading is performed digitally. In this invention interpolation method, picture element outputs are treated as continuous analog signals to detect minute changes in outputs. The method uses analog signals in combination with digital signals in a way comparable to a vernier of a vernier caliper. According to the principle of this invention, when the image sensor outputs a sample and the waveform in the stepped form as shown by the line RL in FIG. 12, the waveform becomes as shown by the broken line BL to thereby detect $\Delta N$ which is segmented smaller than a picture element. In the prior art, when the image sensor outputs such a waveform, it usually is quantized by the quantization level SL to read picture elements in the number of $N_1$ and $N_3$ in highlight and in the number of $N_2$ in shadow. It is possible to obtain $\Delta N$ by detecting and converting in an A/D converter the $N_1$-th picture element output and $(N_1+1)$-th picture element output and proportionally calculating the point of intersection with the quantization level SL. However, the prior art method tends to complicate the circuits, needs longer time for calculation and presents difficulties with precise detection of minute changes. This invention method is improved from the prior art in that $\Delta N$ can be detected in real time with a simple structure of circuits or in other words, this invention method can detect a picture element output with a minute pitch as shown in FIG. 12 by the broken line BL, and can further detect the edges between frames statistically by means of an interpolated variable distribution. The output in picture element arrays detected with a pitch relatively smaller than the picture element pitch film negative is processed to detect the length of a binary signal based upon the interpolated signals as shown in $W_1$, $W_2$ and so on. The length of the signal $W_1$ can be calculated in the formula below in FIG. 9.

$$W_1 = N_1 \cdot T + \Delta N \cdot T = T(N_1 + \Delta N) \tag{1}$$

if measured at the clock t, $$T = kt \tag{2}$$

the formula below holds from the formula (1), $$W_1 = kt(N_1 + \Delta N) \tag{3}$$

If k is 10, $\Delta N$ can be measured to the extent of the length of picture element 0.1 to obtain interpolated measured values.

Figure 13:
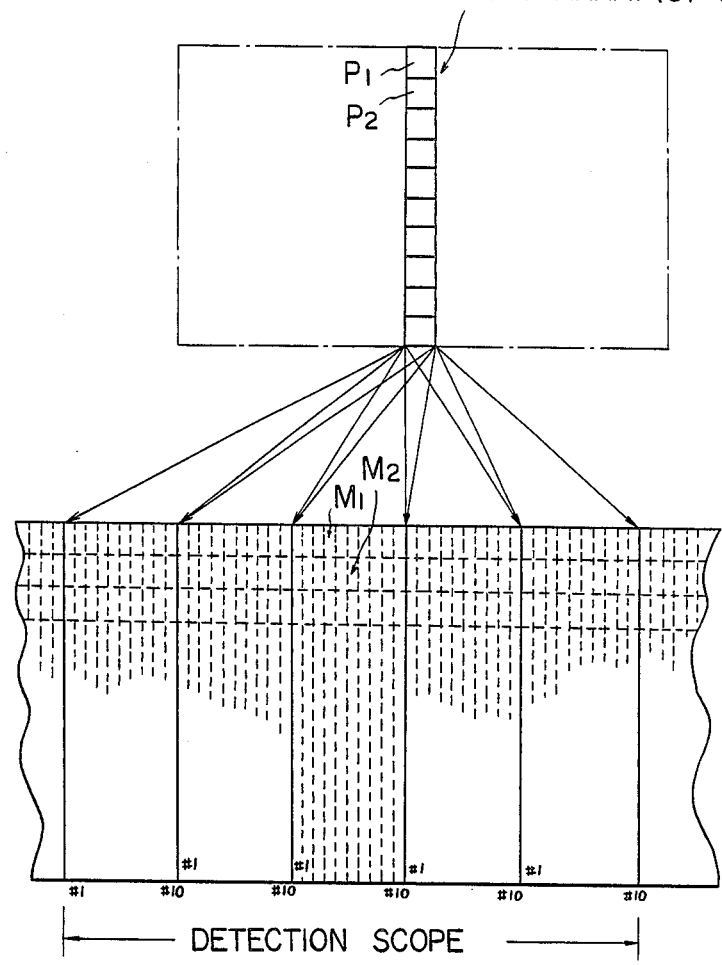
FIGS. 13 and 14 are explanatory views of the relationship between detected data from the picture element arrays and memory according to this invention.
Figure 14:
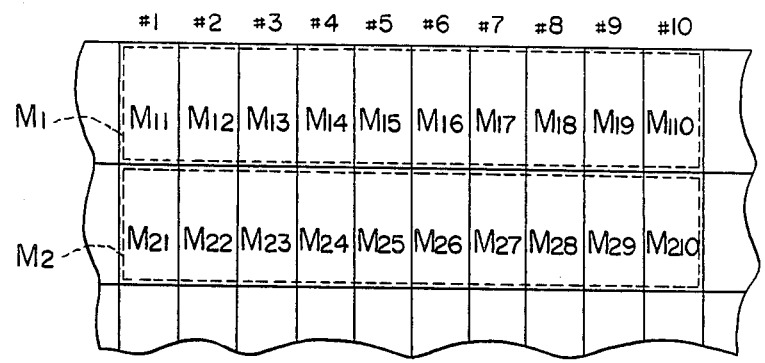

A more detailed explanation will be given below:

According to this invention as shown in FIG. 13, for either a singular or plural representative picture element arrays(s) P on the two-dimensional image sensor are prepared memory picture element array data zones M in the memory in a plural number, for instance the zone equivalent to ten elements #1 through #10. More particularly, for example, the memory picture elements data $M_1$ in correspondence with the imaged picture element $P_1$ extends from $M_{11}$ through $M_{110}$ as shown in FIG. 14 and the memory picture element data $M_2$ extends from $M_{21}$ through $M_{210}$ in correspondence with another imaged picture element $P_2$. In this manner a memory picture element data for any imaged picture comprises #1 through #10.

Figure 15:
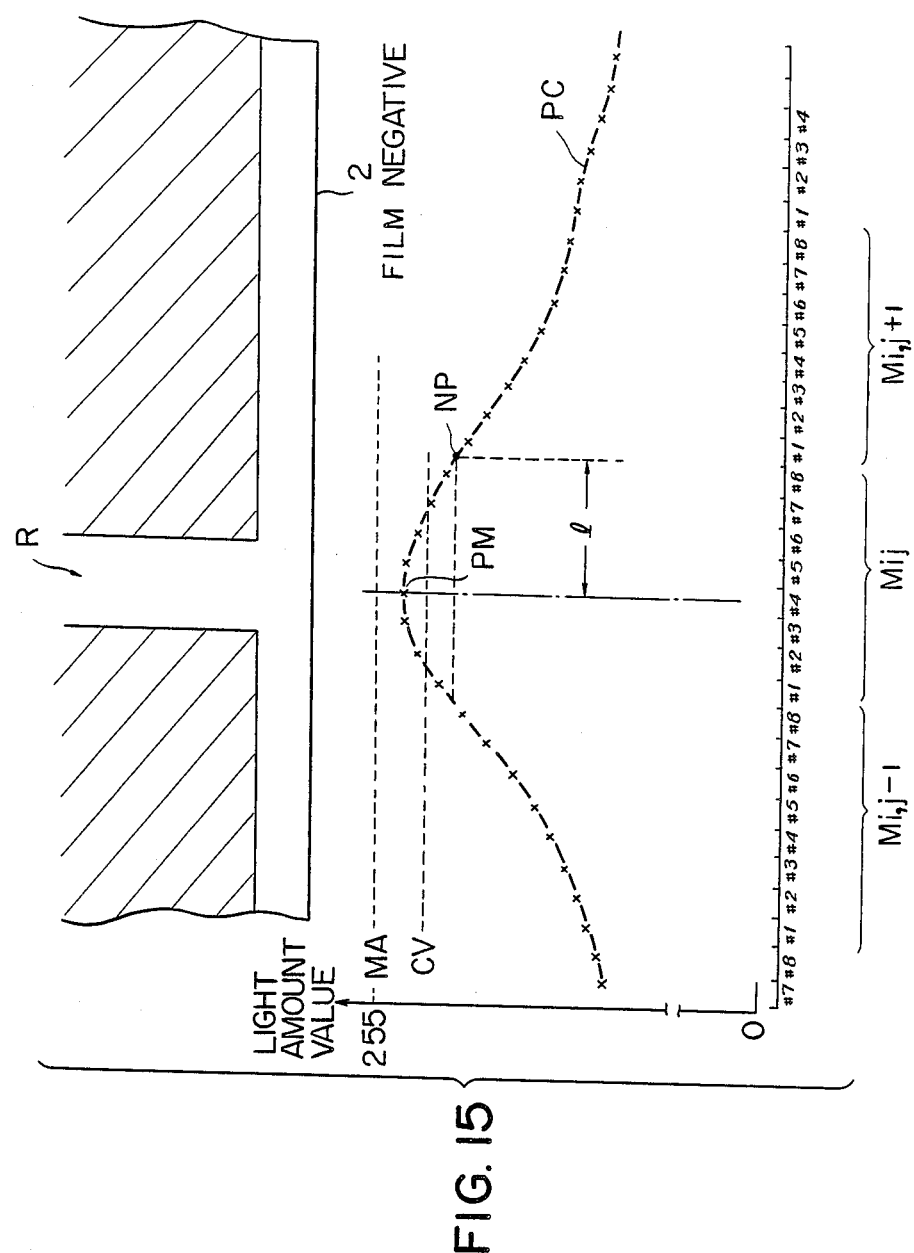
FIG. 15 is a view showing the correspondence between a negative and detected data on the memory.

After having stored the data, the stored data on the 5 picture elements or in other words, image data detected by interpolating picture element pitches on the film negative 2 is processed to obtain a light amount characteristic PC and to detect an edge between unimaged zones R between two frames and a frame on the film negative 2 as shown in FIG. 15. The maximum value PM of the light amount characteristics PC should be between the light amount value MA of unimaged zones of the film negative 2 and the threshold value CV which is lower than the light amount value MA by a predetermined ratio (e.g. 80%). This is because that an edge of an imaged frame on the film negative 2 exists on the boundary line between an imaged frame and an unimaged area and generally has a light amount larger than the predetermined threshold value CV. The distance from the maximum value PM of the characteristics PC to the point where the inclination of the characteristics PC become negative or the length l from the maximum PM to the point the light amount value becomes negative should be a predetermined distance (e.g. 1 mm) or higher. This is because that an edge generally comes after the unimaged portion of a frame and noise components should be eliminated. This scope may include an allowable width. Since the light amount NP at the distance l from the maximum value PM corresponds to an edge of a frame, the scope should be within a ratio against the maximum value PM. In other words, the light amount always stays at a value smaller than the maximum value PM and yet the inclination should have a certain magnitude. If the difference between the maximum PM and the light amount NP is relatively small, it is extremely difficult to distinguish imaged portion from unimaged portion on a film negative. In such a case, the negative film should be conveyed by a constant length, and if all the three conditions are met, an edge is detected. In this example, an anti-logarithmic value of the light amount is obtained in 8 bits (0 to 255). Although the picture element array zone to be stored in a memory is described as "10 arrays" for each imaged picture element array in the aforementioned embodiment, the number may be arbitrary. Although the processing was exemplified with the light amount in anti-logarithmic values in the above embodiment, it may be processed in density values.

Figure 16A:
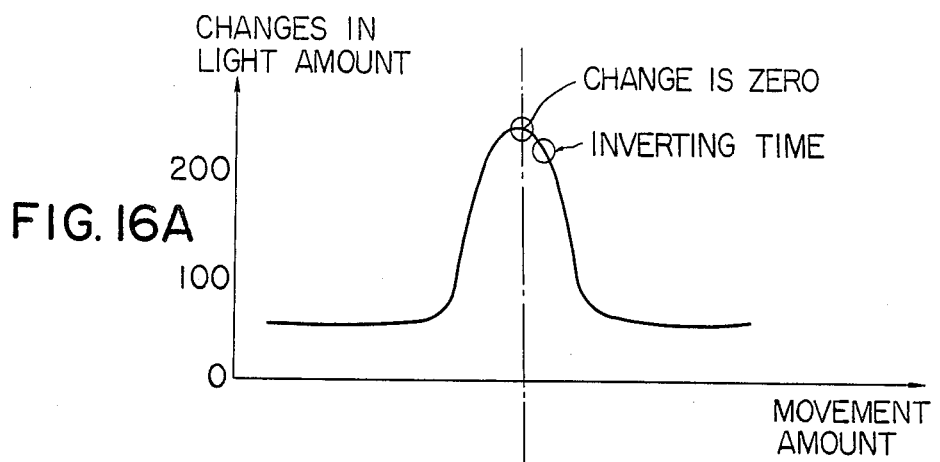
Figure 16B:
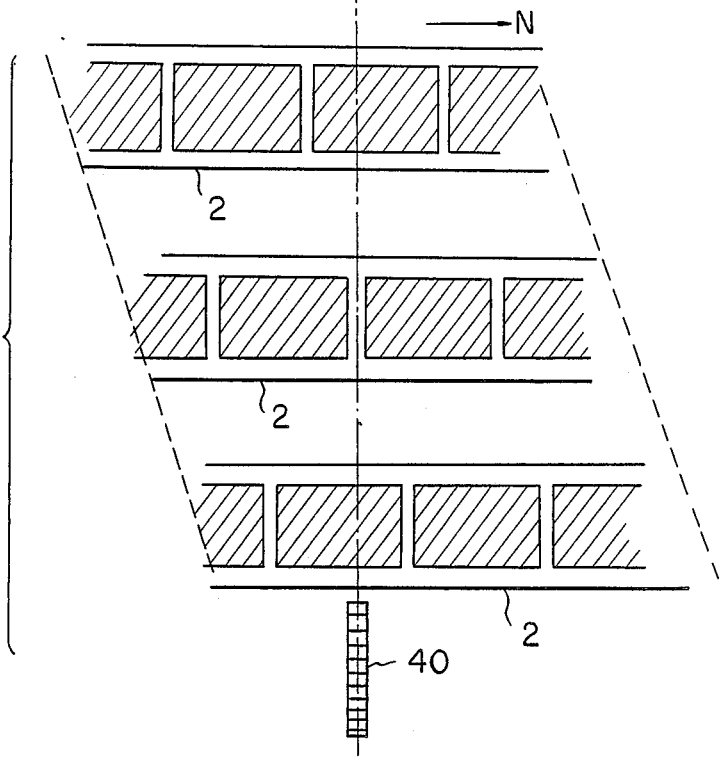

FIGS. 16A, 16B and FIGS. 17A through 17C show the edge detection described in the above. When the film negative 2 is advanced at a minute pitch as shown in FIG. 16B, changes in time series (or changes in light amount) of the picture element array 40 of the images sensor 11 are detected as shown in FIG. 16A. The position where the change becomes zero is detected as an unimaged zone between frames. In FIGS. 17A and 17B show the sensor outputs from adjacent two arrays while FIG. 17C shows the difference between the above two or FIG. 17B−FIG. 17A. Unimaged portions between frames can be detected from the points where changes become zero, and an edge from the point where inclination of the curve is inverted.

FIG. 18 is a table to show an example of data on errors caused between detected edges by the aforementioned algorithm and actually measured values of a film negative (frames #1 through #24). In this example, there are listed the values DT (in unit mm) detected at the point where the light amount is NP and which is lower than the maximum value PM by 65% or removed therefrom by the distance 1, the values R (in unit mm) actually measured at the point removed from the maximum value Pm by the distance l and the difference or error therebetween (DT−R). As is obvious from the table, the errors exist substantially within the scope of ±0.2–0.3 mm. Considering that the precision required for the positioning a frame is about ±0.5 mm, the errors stay sufficiently within a practical allowance.

Figure 19:
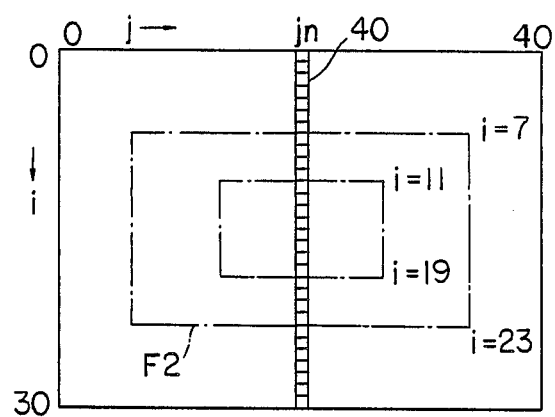
FIG. 19 is an explanatory view of a usable scope of picture element arrays.

In automatic controlling of the conveyance of frames, since the size of a frame has been known either by measurement of data input, a detection area for image information is selected and aforementioned picture element array 40 is extracted on the frame size as shown in FIG. 19. If the picture elements of the image sensor 11 comprises j-array (1–40)×i-array (1–30), a zone F2 is chosen for a 135 F size while a zone F1 is chosen for 110 size film. Setting a measured value $TS_{ij}$ of an element $S_{ij}$ of the image sensor 11 an anti-logarithmic value at a sampled point extracted at jn-th in the j-array. In the case of 135 F size film, as the average value $\overline{T}$ is 23−7=16, the relationship below holds.

$$\overline{T} = \sum_{i=7}^{23} TS_{i,jn}/16 \tag{4}$$

In case when the film negative 2 is detected with a minute pitch, the anti-logarithmic value $THS_{135F}$ of the 135 F size at an adjacent point can be calculated from the following formula:

$$THS_{135F} = \frac{\sum_{i=7}^{23} TS_{i,jn} + \sum_{i=7}^{23} TS_{i,jn+1} + \cdots}{16} \tag{5}$$

In the case of the 110 size, as the average value $\overline{T}$ will be calculated as below since 19−11=8 shows picture element;

$$\overline{T} = \sum_{i=11}^{19} TS_{i,jn}/8 \tag{6}$$

When the film negative 2 is detected with minute pitches, the anti-logarithmic value $THS_{110}$ of the 110 size at an adjacent sampling point can be obtained from the following formula.

$$THS_{110} = \frac{\sum_{i=11}^{19} TS_{i,jn} + \sum_{i=11}^{19} TS_{i,jn+1} + \cdots}{8} \tag{7}$$

By sampling those measured values to obtain frequency distribution, a curve of anti-logarithmic values PC can be obtained as shown in FIG. 15. The arrays ij of the detection zone in FIG. 19 can be arbitrarily selected.

As described in detail in the foregoing statement, as this invention system can achieve high resolution depending on the purposes with a two-dimensional image sensor with a relatively rough resolution, it can be practically used as a sensor quite effectively for controlling conveyance and exposure amount of the film negative and adaptable for various sizes of film negatives and plural feeding directions. This invention enables processing of data of detected image in set at a higher speed by means of a two-dimensional image sensor having a relatively rough density in picture elements, uses the same two-dimensional image sensor for extraction of detected data, and enhances the resolution by interpolation of inter-element pitches to achieve precise conveyance of the film negative. The system is also adapted to be automatically switched depending on the size of a film sheet or the feeding direction thereof to achieve a photographic system at a higher efficiency for universal purposes at a low cost.

As a picture element array(s) which intersect at a right angle the feeding direction of film negative is selected to extract detected data for processing, frames of a film sheet can be automatically positioned at predetermined positions precisely irrespective of the feeding direction of the film by means of a simple structure to effectively realize photographic processing.

It should be understood that many modifications and adaptations of the invention will become apparent to those skilled in the art and it is intended to encompass such obvious modifications and changes in the scope of the claims appended hereto.

What is claimed is:

1. A detection/processing method for image information which is obtained by photometrically measuring an original film with a two-dimensional image sensor and which is segmented into picture elements comprising the steps of: detecting and processing data for controlling the conveyance of said original film from one of either a singular picture element array or plural picture element array, said array or arrays intersecting at a right angle with the conveying direction of said original film and said data being detected and processed in accordance with the size of the original film; detecting and processing data for controlling exposure from the picture element matrix of said original film in accordance with said direction and size of the original film.

2. A detection/processing method for image information as claimed in claim 1, wherein said conveyance direction and size of said original film are detected by said two-dimensional image sensor.

3. A detection/processing method for image information as claimed in claim 2, wherein said two-dimensional image sensor comprises a CCD sensor.

4. A detection/processing method for image information as claimed in claim 1, wherein said original film is a film negative roll.

5. A detection/processing method for image information as claimed in claim 1, wherein said picture frame size is measured visually.

6. A detection/processing method for image information which is obtained by photometrically measuring an original film with a two-dimensional image sensor which is segmented into picture elements comprising the steps of: detecting and processing data for controlling the conveyance of said original film from one of either a singular picture element or plural element arrays, said array or arrays intersecting at a right angle with the conveying direction of said original film and said data being detected and processed in accordance with the size of the original film; detecting the outputs of said picture element array or arrays at a pitch which is relatively smaller than the picture element pitch of said two-dimensional image sensor and processing the outputs so as to interpolate said picture element pitch so as to detect image data with a high resolution; detecting and processing data for controlling exposure from the picture element matrix of said original film in accordance with said direction and size of the film.

7. A detection/processing method for image information as claimed in claim 6, wherein the conveying direction and size of said original film are detected by said two-dimensional image sensor and wherein said conveyance direction is detected by comparing characteristic density patterns.

8. A detection/processing method for image information as claimed in claim 7, wherein the conveying direction and size of said original film are detected by said two-dimensional image sensor and wherein said conveyance direction is detected by comparison of the volume or number of characteristic density values, characteristic number or number of anti-logarithmic patterns.

9. A detection/processing method for image information as claimed in claim 6, wherein said interpolation step is conducted by detecting edges of image frame by a statistical method or variable distribution.

10. A detection/suspension method for imaged frames which comprises the steps of: receiving with a two-dimensional image sensor the light transmitted through an original film sheet from a light source; detecting the transmitted or reflected light from said original film and detecting edges of frames of said original film in accordance therewith; advancing said film by a predetermined distance in accordance with the size thereof and suspending the same at a location; wherein detected data for the step of detecting edges are selected from a picture element array of said sensor which intersects at a right angle with the conveying direction of said film.

11. A detection/suspension method for imaged frames which comprises the steps of: receiving with a two-dimensional image sensor the light transmitted through said original film from a light source; detecting the transmitted or reflected light from said original film and detecting edges of imaged frames of said film in accordance therewith; advancing the film by a predetermined distance in accordance with the size thereof and suspending the same at a location; wherein image data of the whole area from which said two-dimensional image sensor receives the light are detected for each segmented picture element, and the characteristic volume of said detected values are compared with stored data to determine the size and direction of said original film; detected data are selected from a picture element array wherein the conveying direction intersects at right angle with the image sensor direction based upon the direction of said film, and said edges are detected therefrom for detection/suspension of original film.

* * * * *